UNITED STATES PATENT OFFICE.

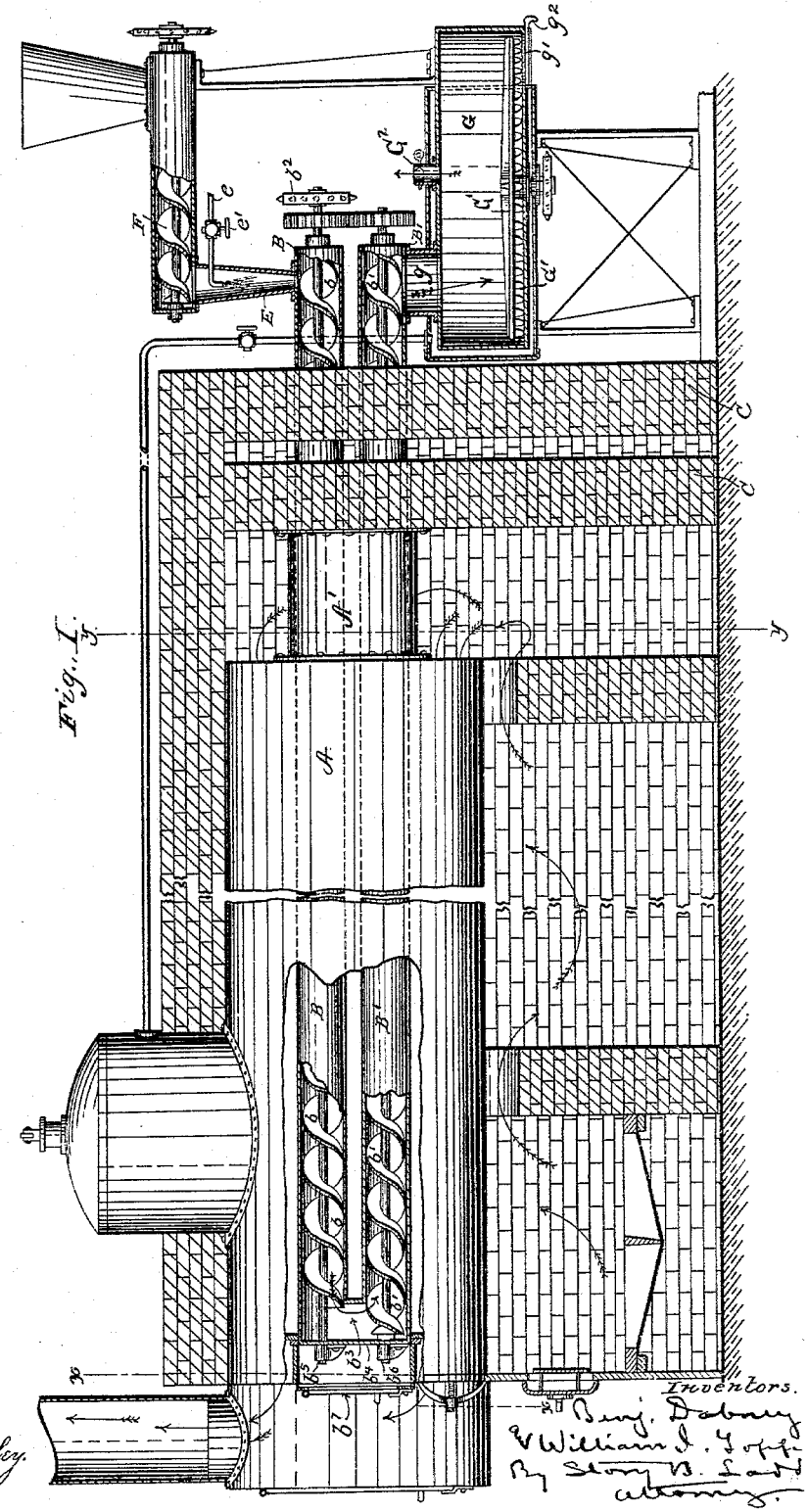

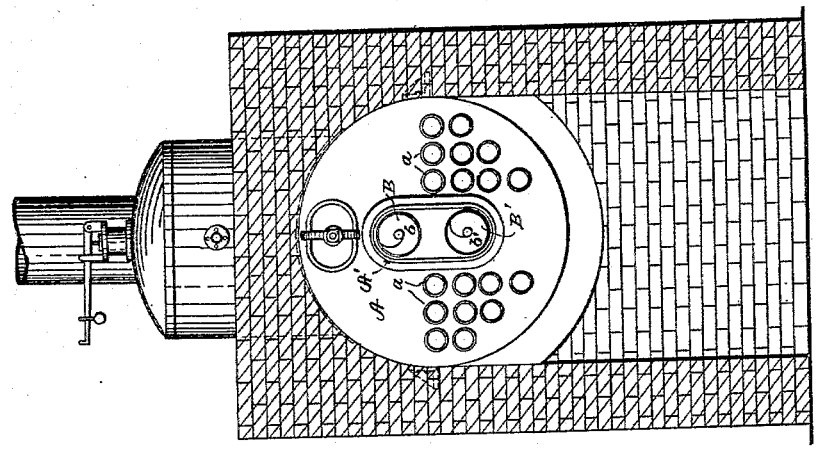

BENJAMIN DABNEY, OF BONHAM, AND WILLIAM I. YOPP, OF HOUSTON, TEXAS.

APPARATUS FOR COOKING COTTON-SEED MEAL.

SPECIFICATION forming part of Letters Patent No. 545,271, dated August 27, 1895.

Application filed March 7, 1894. Serial No. 502,752. (No model.)

*To all whom it may concern:*

Be it known that we, BENJAMIN DABNEY, residing at Bonham, in the county of Fannin, and WILLIAM I. YOPP, residing at Houston, in the county of Harris, State of Texas, citizens of the United States, have invented certain new and useful Improvements in Apparatus for Cooking Cotton-Seed Meal; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of the present invention is to provide an apparatus for cooking or treating cotton-seed meal, so as to obtain therefrom the maximum amount of oil in the subsequent treatment of the meal for its extraction; and the invention embodies an apparatus which admits of the requisite amount of moisture being supplied to the meal when there is a deficiency of natural moisture in the same and for the subsequent evaporation of any excess of moisture, together with the gradual and continuous feed of the meal into and through a water-bath, whereby the development of steam in contact with the meal itself takes place gradually and injury to the meal by reason of the direct application of hot live steam is avoided.

The invention consists of a boiler or heater and of certain details of construction, all of which will be fully described, and then pointed out in the claims.

In the accompanying drawings, Figure 1 is a side elevation, partly in section, of an apparatus adapted to practice this process. Fig. 2 is a sectional view of the boiler on the line $x\ x$, and Fig. 3 is a like section on the line $y\ y$.

A is an ordinary cylindrical tubular steam-boiler, $a$ indicating the fire-tubes.

Centrally placed within the boiler and below the water-line thereof there is a pair of conveyer-tubes B B', one above the other, and each provided with a screw conveyer $b\ b'$, supported on end bearings. These conveyer-tubes and conveyers extend back beyond the end of the boiler and through the furnace-wall C C and respectively receive the raw meal and discharge the cooked meal at their outer ends. A power connection is shown at $b^2$ for driving the conveyers. At the inner end the two conveyer-flues are joined by the downflue $b^3$, one side of which is formed by the plate or partition $b^4$, which is provided with the bearings $b^5\ b^6$ for the inner ends of the screw conveyers. These bearings are closed in and protected from the hot gases and products of combustion by the iron door $b^7$, and access can be had to them for oiling, &c., through the flue-cleaning door in the head of the boiler and this inner door $b^7$. At the opposite end of the boiler the conveyer-flues where they leave the boiler proper and are continued across the fire-space to the furnace-wall C are protected by a continuation A' of the boiler proper, which forms a neck incasing the conveyer-tubes and a water-jacket for them, protecting them and the metal from the effect of too high a temperature. A receiver or feed-chute for the meal to the first conveyer-tube is shown at E, and the same has a water-pipe $e$, with valve $e'$, by means of which the requisite amount of water is sprayed into or added to the meal as the same passes down the feeding-chute E into the machine.

F is a conveyer for feeding the meal to the receiving-chute E from any preliminary machine for treating the meal or source of supply, or the feeding-chute E may be a supply-hopper into which the meal is dumped. The lower conveyer-tube B' discharges the meal into a steam-jacketed drum or receptacle G through the connecting-pipe $g$, and any excess of moisture carried by the meal after it thus leaves the cooker is evaporated off in this receptacle. This drum is provided with a revolving rake G', which distributes the meal on the floor of the drum and at the same time turns it over and works it around to the discharge-opening $g'$. $G^2$ is an outlet pipe or opening for the escape of moisture or steam, with a damper or slide to regulate the same. The discharge-hole $g'$ may have a slide $g^2$ for partially closing the same to fit the requirements of the case.

From what has preceded, the operation of the apparatus will be easily understood. The meal being fed into the upper conveyer-flue through the receiver D and the cock of the water-pipe being set so as to add the proper amount of water to the meal, it travels slowly and steady along through the conveyer-tube B to the inner end, then drops to the lower conveyer-tube B' and travels back in a steady stream out of the boiler and is discharged into the steam-jacketed receiver G, the latter being so set as to effect the evaporation of what excess of moisture the meal may carry, if any, while it is traveling through the evaporating-drum to the discharge-opening thereof. Thus the meal is at all times moving and is subjected to constant and uniform conditions, which, being easily maintained, secures a uniform result.

We have herein shown and described the preferred form of apparatus for practicing our invention; but we wish it to be distinctly understood that we are not necessarily limited thereto.

In carrying out the invention other forms of conveyers may be used. The number of channels for the passage of the meal through the water-bath is not material, and the details of construction and arrangement can be varied, so far as the generic invention is concerned, to suit convenience; and, further, the term "cotton-seed meal" is herein used as meaning any oil-seed or oil-seed product which has to be subjected to heat prior to extracting the oil therefrom.

What we claim as our invention is—

1. The combination with a steam boiler of a conveyer tube and conveyer entering the boiler at one end, an interior chamber contiguous to the soot chamber and containing the inner bearing for the conveyer, and a door into said interior chamber from the soot chamber, substantially as and for the purpose set forth.

2. In an apparatus for cooking cotton-seed meal the combination of a boiler having an end-extension or neck extending from the boiler proper, to the furnace-wall, and a meal conveyer entering said boiler within the extension or neck and arranged below the water level, substantially as set forth.

3. In an apparatus for cooking cotton-seed meal the combination of a boiler having a lateral extension or neck extending from the boiler proper to the furnace wall, a meal conveyer entering the boiler through said extension or neck together with the discharging conveyer passing out through the same, substantially as and for the purpose set forth.

4. In an apparatus for cooking cotton-seed meal the combination of a boiler having a lateral extension or neck extending from the boiler proper to the furnace wall, a meal conveyer entering the boiler through said extension or neck together with the discharging conveyer passing out through the same, with a supply feeder for the first conveyer and an evaporating vessel adapted to receive the meal discharged from the other conveyer, substantially as and for the purpose set forth.

In testimony whereof we affix our signatures in presence of witnesses.

BENJAMIN DABNEY.
WILLIAM I. YOPP.

Witnesses as to the signature of Benjamin Dabney:
V. O. ULLRICH,
CHAS. G. NUNN.

Witnesses as to the signature of William I. Yopp:
JAS. A. BAKER, Jr.,
P. B. TIMPSON.